United States Patent Office 3,840,526
Patented Oct. 8, 1974

3,840,526
NOVEL CLEAVAGE OF THIOKETALS
Marcel Fetizon, Gif-sur-Yvette, and Michel Jurion, Bourg-la-Reine, France, assignors to Roussel-UCLAF, Paris, France
No Drawing. Filed Jan. 25, 1972, Ser. No. 220,714
Claims priority, application France, Jan. 29, 1971, 7102992
Int. Cl. C07c 173/00
U.S. Cl. 260—239.55 A                5 Claims

ABSTRACT OF THE DISCLOSURE

A novel process for the cleavage of thioketals to the corresponding carbonyl derivative in excellent yields by reaction with an alkylating agent in the presence of water.

STATE OF THE ART

The cleavage of a thioketal to obtain the corresponding carbonyl derivative has been a difficult problem to resolve and a satisfactory solution has not been reached so that to protect carbonyl groups, oxygen ketals have been used.

Fieser et al., in the text Advanced Organic Chemistry, New York, 1962, p. 443, states that "thioketals are hydrolyzed with too great difficulty to be useful as protective derivatives."

While this statement is not without basis, there are known several methods of cleaving a thioketal to the corresponding ketone but these methods have various defects. See back in the review synthesis, September 1969, p. 17, and other literature reports on the use of mercury salts for the cleavage but the use of these mercuric salts has the disadvantage of being a toxic reactant. The mercuric salts in the ultimate steps of the synthesis can be found in small amounts in the final product which presents a grave risk of intoxication.

Daum et al. [Tetr. Letters, No. 2 (1967) p. 165] reports the oxidation of the thioketal into the corresponding disulfonyl derivative which is cleaved with oxygen in a basic media to regenerate the ketone group. Karmas [Tetr. Letters, No. 18 (1964) p. 1093] reports the transformation of a thioketal into an acylthioalkylthio group which is hydrolyzed in an acid media to regenerate the ketone function. These two procedures have the disadvantage of not being useful if the molecule has certain other functional groups in addition to the thioketal. For example, ethynyl or hydroxy groups in steroid molecules having a thioketal are attacked when using the said two processes to cleave the thioketal group.

OBJECTS OF THE INVENTION

It is an object of the invention to provide a novel simple process for the cleavage of thioketals in high yields.

It is another object of the invention to provide a novel process for cleavage of thioketals without affecting other functional groups of the basic molecule so the thioketals can be used as protective groups.

These and other objects and advantages of the invention will become obvious from the following detailed description.

THE INVENTION

The novel process of the invention for the cleavage of a thioketal comprises reacting a thioketal with an alkylating agent in the presence of water to obtain the corresponding carbonyl derivative. The reaction is preferably effected in an organic solvent.

The alkylation agent for the cleavage may be a lower alkyl halide of 1 to 7 carbon atoms or a benzyl halide. The preferred agent is methyl iodide although the bromides and chlorides are also useful. The organic solvent may be one of the usual solvents such as acetone, methylene chloride or dichloroethane but is preferably acetone containing water.

It has also been found advantageous to effect the cleavage of the thioketal in the presence of a basic agent capable of neutralizing the H+ ions formed in the reaction. This is particularly useful when the organic reactants are sensitive to an acid media.

Examples of basic agents are basic resins or alkali metal or alkaline earth metal inorganic bases such as sodium bicarbonate, calcium carbonate or barium carbonate.

The process of the invention is applicable to a wide variety of compounds and may be used to cleave thioketals of ketones or thioketals of aldehydes of aliphatic, cyclic, aromatic or heterocyclic series and is particularly useful with terpenes, steroids and sugars.

In the following examples there are described several preferred embodiments to illustrate the invention. However, it should be understood that the invention is not intended to be limited to the specific embodiments.

EXAMPLE I

Androstane-3-ol-6-one 2 g. of androstane-3-ol-6-one (described in thesis of Jurion dated June 27, 1968 at Orsay) were dissolved in 30 cc. of methanol and 1 ml. of ethanedithiol and 1 ml. of boron trifluoride-etherate were added thereto. The mixture was heated for one hour at 80° C. and then cooled and vacuum filtered. The isolated crystals were crystallized from a water-methanol mixture to obtain a 70% yield of 6,6-ethylenedithio-androstane-3-ol melting at 90–91° C. and having a specific rotation $[\alpha]_D = +13.5°$ (c.=1% in chloroform).

1 g. of 6,6-ethylenedithioandrostane-3-ol was dissolved in 25 ml. of acetone and then 2 ml. of methyl iodide and a trace of water were added thereto. The reaction mixture was refluxed for 48 hours and then the volatile fractions were distilled off under reduced pressure. The residue was taken up in methylene chloride and was chromatographed over an alumina plate and eluted with a methanol-ether mixture to obtain 0.79 g. of androstane-3-ol-6-one melting at 141° C. and having a specific rotation $[\alpha]_D = -56°$ (c.=1% in chloroform).

EXAMPLE II

Androstane-17β-ol-3-one 1 ml. of ethanedithiol and 1 ml. of boron trifluoroide-etherate were added to 2 g. of androstane-17β-ol-3-one dissolved in 30 ml. of methanol and the mixture was then stirred and allowed to stand. The crystals formed were recovered by vacuum filtration and were crystallized from a water-methanol mixture to obtain a 98% yield of 3,3-ethylenedithio-androstane-17β-ol melting at 191° C. and having a specific rotation $[\alpha]_D = +22°$ (c.=1% in chloroform).

1 g. of the latter product was added to 25 ml. of acetone and then 2 ml. of methyl iodide and a trace of water were added thereto. The mixture was refluxed for 24 hours and the volatile fraction was removed by distillation under reduced pressure. The residue was taken up in methylene chloride and was chromatographed over an alumina plate and eluted with ether to obtain 0.657 g. of androstane-17β-ol-3-one melting at 179° C. and having a specific rotation $[\alpha]_D = +30°$ (c.=1% in chloroform).

EXAMPLE III

Androstane-17β-ol-3-one 0.5 ml. of 1,3-propanedithiol and 0.5 ml. of boron trifluoride-etherate were added to a solution of 1 g. of androstane-17β-ol-3-one in 20 ml. of methanol and the reaction was stirred for 30 minutes. The volatile fractions were removed by distillation under reduced pressure and the residue was added to water. The precipitate formed was recovered by vacuum filtration and was washed with pentane, crystallized from methanol, washed with pentane and dried to obtain an 81% yield of 3,3-trimethylenedithio-androstane-17β-ol melting at 178° C. and having a specific rotation $[\alpha]_D = +19°$ (c.=1% in chloroform).

1 ml. of methyl iodide and a trace of water were added to a solution of 0.5 g. of 3,3-trimethylenedithio-androstane-17β-ol in 20 ml. of acetone and the mixture was refluxed for 12 hours. The volatile fraction was removed by distillation under reduced pressure and the residue was dissolved in methylene chloride. The solution was chromatographed over an alumina plate and eluted with a 1:1 mixture of ether and pentane to obtain 0.270 g. of androstane-17β-ol-3-one melting at 180° C. and having a specific rotation $[\alpha]_D = +29°$ (c.=1% in chloroform).

EXAMPLE IV

17α-ethynyl-Δ⁴-androstene-17β-ol-3-one 0.13 ml. of ethanedithiol and 0.13 ml. of boron trifluoride-etherate were added to 50 ml. of methanol and then 0.5 g. of 17α-ethynyl-Δ⁴-androstene-17β-ol-3-one (ethynyl testosterone) was added. After standing overnight at room temperature, the mixture was concentrated to dryness under reduced pressure and the residue was crystallized from an ether-pentane mixture to obtain 0.5 g. (80% yield) of 3,3-ethylenedithio-17α-ethynyl-Δ⁴-androstene-17β-ol melting at 137° C. and having a specific rotation $[\alpha]_D = +8.5°$ (c.=dioxane).

1 ml. of methyl iodide and a trace of water were added to a solution of 0.200 g. of 3,3-ethylenedithio-17α-ethynyl-Δ⁴-androstene-17β-ol in 30 ml. of acetone and the mixture was refluxed for 24 hours. The volatile fractions were distilled off under reduced pressure and the residue was chromatographed over an alumina plate and eluted with a 1:1 ether-pentane mixture to obtain 0.135 g. of 17α-ethynyl-Δ⁴-androstene-17β-ol-3-one melting at 270° C. and having a specific rotation $[\alpha]_D = +22°$ (dioxane).

EXAMPLE V

Δ⁴-androstene-17β-ol-3-one 1 cc. of boron trifluoride-etherate and 1 cc. of ethanedithiol were added to 30 ml. of methanol followed by the addition of 2 g. of Δ⁴-androstene-17β-ol-3-one (testosterone). The mixture was refluxed for 1 hour, cooled and then vacuum filtered to recover the precipitate which was washed with pentane and crystallized from a methanol-water mixture to obtain a 92% yield of 3,3-ethylenedithio-Δ⁴-androstene-17β-ol melting at 110° C. and having a specific rotation $[\alpha]_D = +137°$ (c.=1% in chloroform).

1 ml. of methyl iodide and a trace of water were added to a solution of 0.500 g. of 3,3-ethylenedithio-Δ⁴-androstene-17β-ol in 25 ml. of acetone and the mixture was refluxed for 24 hours. The volatile fractions were distilled off under reduced pressure and the residue was chromatographed over an alumina plate and eluted with ether to obtain an 89.5% yield of Δ⁴-androstene-17β-ol-3-one melting at 151° C. and having a specific rotation $$[\alpha]_D = +108°$$

(c.=1% in chloroform).

EXAMPLE VI

Δ⁵-pregnene-3-ol-20-one 1 ml. of boron trifluoride-etherate and 1 ml. of ethanedithiol were added to 3 0ml. of methanol followed by the addition of 2 g. of Δ⁵-pregnene-3-ol-20-one. The mixture was stirred and then allowed to stand and was vacuum filtered. The recovered crystals were washed with pentane and were crystallized from a water-methanol mixture and dried to obtain a 92% yield of 20,20-ethylenedithio-Δ⁵-pregnene-3-ol melting at 183° C. and having a specific rotation $[\alpha]_D = -51°$ (c.=1% in chloroform). This product is described in U.S. Pat. 3,193,563.

0.5 g. of the said product was dissolved in 25 ml. of acetone and then 1 ml. of methyl iodide and a trace of water were added and the mixture was refluxed for 24 hours. The volatile fractions were distilled off under reduced pressure and the residue was chromatographed over an alumina plate and eluted with ether to obtain 0.272 g. of Δ⁵-pregnene-3-ol-20-one melting at 187° C. and having a specific rotation $[\alpha]_D = +17°$ (c.=1% in chloroform).

EXAMPLE VII

Tigogenone 1 g. of tigogenone (obtained in 93% yield by oxidation of tigogenin with silver carbonate) was added to 120 ml. of methanol followed by the addition of 1 ml. of ethanedithiol and 1 ml. of boron trifluoride-etherate. The mixture was refluxed for 2 hours and then was cooled and vacuum filtered. The recovered precipitate was washed with pentane and then crystallized from a methylene chloride-ether mixture to obtain a 90% yield of the 3,3-ethylenedithioketal of tigogenone melting at 302° C. and having a specific rotation $[\alpha]_D = -54°$ (c.=1% in chloroform).

0.5 g. of the said product was dissolved in 30 ml. of methylene chloride and 1 ml. of methyl iodide and a trace of water were added to the solution which was then refluxed for 24 hours. The volatile fractions were distilled off under reduced pressure and the residue was chromatographed over an alumina plate and eluated with a 1:1 mixture of ether and pentane and crystallized from an ether-methylene chloride mixture to obtain an 81% yield of tigogenone melting at 204–6° C. and having a specific rotation $[\alpha]_D = -49°$ (c.=1% in chloroform).

EXAMPLE VIII

Androstane-17-ol-3-one 0.5 ml. of 2-mercapto-ethanol and 0.5 ml. of boron trifluoride-ethereate were added to a solution of 500 mg. of androstane-17-ol-3-one in 20 ml. of acetic acid and after stirring the mixture for 15 minutes, a few drops of water were added. The mixture was cooled and vacuum filtered. The recovered crystals were crystallized from methanol, then a pentane-methylene chloride mixture to obtain an 80% yield of the hemithioethyleneketal of androstane-17-ol-3-one melting at 147° C. and having a specific rotation $[\alpha]_D = +16.5°$ (c.=1% in chloroform).

200 mg. of the said product were dissolved in 30 ml. of acetone and 1 ml. of methyl iodide and a trace of water were added thereto. The mixture was refluxed for 36 hours and the volatile fractions were distilled off. The residue was chromatographed over alumina and was eluted with ether to obtain a 75% yield of androstane-17-ol-3-one melting at 180° C. and having a specific rotation $[\alpha]_D = +32°$ (c.=1% in chloroform).

EXAMPLE IX

17α-methyl-Δ⁴-androstene-17β-ol-3-one 500 mg. of methyl testosterone were dissolved in 30 ml. of methanol and then 0.2 ml. of ethanedithiol and 0.2 ml. of boron trifluoride-etherate were added thereto. The mixture was stirred for 30 minutes and then was cooled and vacuum filtered. The recovered crystals were crystallized from pentane to obtain an 80% yield of 3,3-ethylenedithio - 17α - methyl-Δ⁴-androstene-17β-ol melting at 163–165° C. and having a specific rotation $[\alpha]_D = +108°$ (c.=% in chloroform).

100 mg. of the said product were dissolved in 20 ml. of acetone and then 0.3 ml. of an aqueous saturated sodium bicarbonate solution and 1 ml. of methyl iodide were added thereto. The mixture was refluxed for 30 hours and the volatile fractions were distilled off under reduced pressure. The residue was dissolved in methylene chloride and the solution was chromatographed over silica gel. The product was crystallized from a methylene chloride and pentane mixture to obtain a 75% yield of a 17α-methyl-Δ⁴-androstene-17β-ol-3-one melting at 163° C. with a specific rotation $[\alpha]_D = +76°$ (c.=1% in chloroform).

EXAMPLE X

Cholane-24-one 500 mg. of cholane-24-one were dissolved in 10 ml. of methylene chloride and 0.2 ml. of ethanedithiol and a few drops of boron trifluoride-etherate were added thereto. The mixture was stirred for 1 hour and then was concentrated by distillation under reduced pressure. The residue was chromatographed over silica gel and was eluted with pentane to obtain a 90% yield of the ethylenedithioketal of cholane-24-one with a specific rotation $[a]_D = +29°$ (c.=1% in chloroform).

300 mg. of the said product were dissolved in 35 ml. of acetone and 0.3 ml. of an aqueous saturated sodium bicarbonate solution and 2 ml. of methyl iodide were added thereto. The mixture was refluxed for 36 hours and the volatile fractions were distilled off under reduced pressure. The residue was taken up in ether and the solution was dried over sodium sulfate. The product was chromatographed over silica gel and was eluted with pentane to obtain a 60% yield of cholane-24-one melting at 103° C. and having a specific rotation $[\alpha]_D = +25°$ (c.=1% in chloroform).

EXAMPLE XI 1,2-dithiomethyl-4,5-dimethylbenzene 200 mg. of 3,7,8 - trimethyl-3-phenyl-benzo-2,4-dithiepinne were dissolved in 25 ml. of acetone and 1 ml. of methyl iodide and a trace of water were added thereto. The reaction mixture was refluxed for 24 hours and the volatile fraction was distilled off under reduced pressure. The residue was dissolved in acetone and chromatographed over silica gel and eluted with a 5:1 mixture of pentane and ether to recover a 90% yield of acetophenone and a 47% yield of 1,2-dithiomethyl-4,5-dimethylbenzene.

Various modifications of the process of the invention may be made without departing from the spirit or scope thereof, moreover, it is to be understood that the invention is to be limited only as defined in the appended claims.

We claim:

1. A process for the cleavage of a thioketal comprising reacting a thioketal with an alkylating agent selected from the group consisting of lower alkyl halide of 1 to 7 carbon atoms and benzyl halide in the presence of water to obtain the corresponding carbonyl derivative.

2. The process of claim 1 wherein the alkylating agent is a lower alkyl halide.

3. The process of claim 2 wherein the agent is methyl iodide.

4. The process of claim 1 wherein the reaction is effected in the presence of a basic agent selected from the group consisting of alkali metal and alkaline earth inorganic bases and basic resins.

5. The process of claim 1 wherein the reaction is effected in an organic solvent.

References Cited

UNITED STATES PATENTS

| | | | |
|---|---|---|---|
| 3,395,161 | 7/1968 | Schroff | 260—397.4 |
| 3,461,142 | 8/1969 | Kincl | 260—397.4 |

ELBERT L. ROBERTS, Primary Examiner

U.S. Cl. X.R.

260—239.55 C, 397.3, 609